United States Patent
Chen et al.

(10) Patent No.: US 12,534,784 B2
(45) Date of Patent: *Jan. 27, 2026

(54) ULTRA-HIGH-STRENGTH STEEL HAVING EXCELLENT PLASTICITY AND METHOD FOR MANUFACTURING SAME

(71) Applicant: BAOSHAN IRON & STEEL CO., LTD., Shanghai (CN)

(72) Inventors: Mengxiao Chen, Shanghai (CN); Yong Zhong, Shanghai (CN); Meng Chen, Shanghai (CN); Li Wang, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 478 days.

This patent is subject to a terminal disclaimer.

(21) Appl. No.: 18/009,049

(22) PCT Filed: Jun. 9, 2021

(86) PCT No.: PCT/CN2021/099258
§ 371 (c)(1),
(2) Date: Dec. 8, 2022

(87) PCT Pub. No.: WO2021/249446
PCT Pub. Date: Dec. 16, 2021

(65) Prior Publication Data
US 2023/0272511 A1    Aug. 31, 2023

(30) Foreign Application Priority Data
Jun. 11, 2020   (CN) .......................... 202010527353.2

(51) Int. Cl.
*C22C 38/02*     (2006.01)
*C21D 8/02*      (2006.01)
(Continued)

(52) U.S. Cl.
CPC ............ *C22C 38/02* (2013.01); *C21D 8/0226* (2013.01); *C21D 8/0236* (2013.01);
(Continued)

(58) Field of Classification Search
None
See application file for complete search history.

(56) References Cited

U.S. PATENT DOCUMENTS

| 10,287,659 | B2* | 5/2019 | Zhong | ....................... C21D 9/46 |
| 2015/0337416 | A1* | 11/2015 | Zhong | ....................... C21D 9/46 |
| | | | | 148/320 |

(Continued)

FOREIGN PATENT DOCUMENTS

| CN | 101932744 A | 12/2010 |
| CN | 103233161 A | 8/2013 |

(Continued)

OTHER PUBLICATIONS

EP Extended Search Report dated Oct. 20, 2023 for EP App. No. 21822958.1-1103/4166685 PCT/CN2021/1099258.

(Continued)

*Primary Examiner* — Anthony M Liang
(74) *Attorney, Agent, or Firm* — Lei Fang, Esq.; Smith Tempel Blaha LLC

(57) ABSTRACT

Disclosed is an ultra-high-strength steel having excellent plasticity, comprising in mass percent the chemical elements: C: 0.26-0.30 wt %; Si: 0.8-1.00 wt %; Mn: 2.80-3.30 wt %; Al: 0.04-0.08 wt %; with the balance being Fe and other inevitable impurities. Also disclosed is a manufacturing method for manufacturing the ultra-high-strength steel having excellent plasticity, comprising the following steps: (1) smelting and thin slab continuous casting; (2) heating; (3) hot rolling, wherein an oxide scale on the surface of a hot-rolled steel strip has a thickness of ≤6 μm, and (FeO+

(Continued)

$Fe_3O_4) \leq 40$ wt % in the oxide scale on the surface of the hot-rolled strip steel; (4) acid pickling or acid pickling and cold rolling; and (5) continuous annealing: annealing at 800-920° C. and performing slow cooling at 3-10° C./s to 690-760° C.; performing fast cooling to 250-350° C. at 50-100° C.; and then heating to 360-460° C., maintaining the temperature for 100-400 s and cooling to room temperature.

16 Claims, 1 Drawing Sheet

(51) Int. Cl.
    *C21D 9/46*     (2006.01)
    *C22C 38/04*     (2006.01)
    *C22C 38/06*     (2006.01)

(52) U.S. Cl.
    CPC ......... *C21D 8/0273* (2013.01); *C21D 8/0278* (2013.01); *C21D 9/46* (2013.01); *C22C 38/04* (2013.01); *C22C 38/06* (2013.01); *C21D 2211/001* (2013.01); *C21D 2211/005* (2013.01); *C21D 2211/008* (2013.01)

(56) References Cited

U.S. PATENT DOCUMENTS

| | | |
|---|---|---|
| 2016/0177414 A1 | 6/2016 | Takashima et al. |
| 2019/0218652 A1 | 7/2019 | Haga et al. |
| 2019/0256945 A1 | 8/2019 | Zhou et al. |

FOREIGN PATENT DOCUMENTS

| | | |
|---|---|---|
| CN | 103805838 A | 5/2014 |
| CN | 105492643 A | 4/2016 |
| CN | 107641700 A | 1/2018 |
| JP | 2004308002 A | 11/2004 |
| JP | 2009-203548 A | 9/2009 |
| JP | 2010-196115 A | 9/2010 |
| JP | 2015-034327 A | 2/2015 |
| JP | 2016-503458 A | 2/2016 |
| JP | 2019-534941 A | 12/2019 |
| WO | 2018/088421 A1 | 5/2018 |
| WO | 2018/092735 A1 | 5/2018 |
| WO | 2019/189842 A1 | 4/2020 |
| WO | 2020/075394 A1 | 2/2021 |

OTHER PUBLICATIONS

JP Office Action dated Jan. 23, 2023 for 2022-575846.
International Search Report for PCT/CN2021/099258 dated Aug. 30, 2021.
International Written Opinion for PCT/CN2021/099258 dated Aug. 30, 2021.

\* cited by examiner

ULTRA-HIGH-STRENGTH STEEL HAVING EXCELLENT PLASTICITY AND METHOD FOR MANUFACTURING SAME

CROSS-REFERENCE TO RELATED APPLICATIONS

This application is a 371 U.S. National Phase of PCT International Application No. PCT/CN2021/099258 filed on Jun. 9, 2021, which claims benefit and priority to Chinese patent application No. CN202010527353.2 filed on Jun. 11, 2020, the contents of each of the above listed applications are incorporated by reference herein in their entiries.

TECHNICAL FIELD

The present disclosure relates to a steel and a method for manufacturing the same, in particular to a high-strength steel and a method for manufacturing the same.

BACKGROUND

In recent years, in order to reduce vehicle body weight, achieve energy conservation and emission reduction, improve crash safety and reduce manufacturing costs, advanced high-strength steel for automobiles has been widely used in the automobile manufacturing industry. Due to the increased strength of a plate of the advanced high-strength steel, the thickness of the steel plate is reduced, while its excellent formability is maintained. Currently, it has the best overall competitiveness for use as a material for lightweight vehicle bodies.

Advanced high-strength steel based on the phase transformation-induced plasticity (TRIP) effect has good ductility while maintaining high strength. From the perspective of microstructure, TRIP steel is composed of ferrite, bainite and retained austenite. Such a phase structure has constrained further improvement of its strength. Substitution of bainite with martensite as the main strengthening phase can continue to improve the strength of TRIP steel. For the advanced high-strength steel based on the TRIP effect, the main factors dictating its ductility include the shape, volume fraction and stability of retained austenite in the steel, and the stability of retained austenite is closely related to its size and carbon content.

In order to guarantee the strength and ductility of a steel plate, the existing advanced high-strength steel is mostly based on the composition of carbon-manganese steel to which a relatively large amount of alloying elements such as Cr, Mo, Nb, Ti, B and the like are added. This not only increases the material cost, but also increases the difficulty in its manufacturing involving steelmaking, hot rolling and cold rolling.

For example, Chinese Patent Application Publication CN104245971A published on Dec. 24, 2014 and entitled "HIGH-STRENGTH COLD-ROLLED STEEL PLATE AND METHOD FOR PRODUCING SAME" discloses a high-strength steel plate. In the technical solution disclosed by this patent document, the composition of the steel plate comprises: C: 0.1%-0.3%, Si: 0.4%-1.0%, Mn: 2.0%-3.0%, Cr≤0.6%, Si+0.8Al+Cr: 1.0%-1.8%, Al: 0.2%-0.8%, Nb<0.1%, Mo<0.3%, Ti<0.2%, V<0.1%, Cu<0.5%, Ni<0.5%, S≤0.01%, P≤0.02%, N≤0.02%, B<0.005%, Ca<0.005%, Mg<0.005%, REM<0.005%, and a balance of Fe and unavoidable impurities. The microstructure (volume %) comprises: retained austenite 5%-20%, bainite+bainitic ferrite+tempered martensite≥80%, polygonal ferrite ≤10%, martensite–austenite≤20%. It should be pointed out that because of the need to incorporate a certain amount of Cr and Mo into the steel composition involved in this technical solution, although its tensile strength is ≥980 MPa, the elongation is only about 14%. Hence, this steel is not quite advantageous in terms of cost and formability when it is used as steel for automobile parts.

For another example, Chinese Patent Application Publication CN106574342A published on Apr. 19, 2017 and entitled "HIGH-STRENGTH STEEL PLATE AND METHOD FOR MANUFACTURING SAME, AND METHOD FOR MANUFACTURING HIGH-STRENGTH GALVANIZED STEEL PLATE" discloses a high-strength steel plate. In the technical solution disclosed by the patent document, the manufacturing method is as follows: a steel slab having the required composition is heated to 1100-1300° C.; the temperature at the exit side in the finish rolling is 800-1000° C.; the average coiling temperature is 450-700° C.; after pickling, the steel plate is kept at a temperature of 450° C. to Ac1 for 900-36000 s, and then cold rolled at a reduction rate of 30% or more; the steel plate is heated to 820-950° C. for the first annealing, then cooled to below the Ms temperature at an average cooling rate of 15° C./s till 500° C., then heated to 740-840° C. for the second annealing, cooled to 150-350° C. at a cooling rate of 1-15° C./s, then heated to 350-550° C. and held for more than 10 s. In the technical solution disclosed by this patent document, heating and rolling are required, and two annealing treatments are used, so the production process is complex, and the manufacturing cost is increased. Therefore, its use in the automobile field is restricted greatly.

For still another example, International Patent Application Publication WO2018/116155 published on Jun. 28, 2018 and entitled "HIGH-STRENGTH COLD ROLLED STEEL SHEET HAVING HIGH FORMABILITY AND A METHOD OF MANUFACTURING THEREOF" discloses a highly formable high-strength cold-rolled steel plate. In the technical solution disclosed by this patent document, the composition of the steel plate comprises: C: 0.19%-0.24%, Mn: 1.9%-2.2%, Si: 1.4%-1.6%, Al: 0.01%-0.06%, Cr: 0.2%-0.5%, P≤0.02%, S≤0.003%, one or more optional: Nb: 0.0010%-0.06%, Ti: 0.001%-0.08%, V: 0.001%-0.1%, Ca: 0.001%-0.005%, and a balance of Fe and unavoidable impurities. It should be pointed out that the steel involved in this technical solution has a tensile strength of ≥1150 MPa, an elongation of ≥13%, and a hole expansion rate of ≥30%. Although its tensile strength is high, it incorporates a relatively large amount of the Cr, Nb and Ti elements. Therefore, it is not suitable for automotive steel which has very strict cost control requirements.

SUMMARY

One of the objects of the present disclosure is to provide an ultra-high-strength steel having excellent plasticity. The composition of the ultra-high-strength steel having excellent plasticity is designed in a simple way, wherein full use is made of the law by which the C, Si and Mn elements influence the phase transformation of a material, so as to guarantee the strength and ductility of the steel plate. The steel has a yield strength of 850-1000 MPa, a tensile strength of 1180-1300 MPa, a uniform elongation of ≥11%, and an elongation at break of 15%-20%. It is promising and valuable for use in practice.

In order to achieve the above object, the present disclosure provides an ultra-high-strength steel having excellent plasticity, comprising the following chemical elements in mass percentages:

C: 0.26-0.30 wt %;
Si: 0.8-1.00 wt %;
Mn: 2.80-3.30 wt %;
Al: 0.04-0.08 wt %;
a balance of Fe and other unavoidable impurities.

In the technical solution according to the present disclosure, the common carbon-silicon-manganese steel is adopted in the design of the composition, and full use is made of the law by which the C, Si and Mn elements influence the phase transformation of a material, thereby realizing a combination of the high strength and the high ductility of the high-strength steel of the present disclosure, and finally proving a steel plate product having excellent performances. The principles for designing the various chemical elements are described specifically as follows:

C: In the ultra-high-strength steel having excellent plasticity according to the present disclosure, C is the most important solid solution strengthening element, and can effectively guarantee the strength of the steel. When the mass percentage of the C element in the steel is higher, the fraction of retained austenite is higher, and the enrichment degree of C in retained austenite during partitioning is higher. This is beneficial to enhance the stability of retained austenite, induce the TRIP effect, and improve the ductility of the material. However, it should be noted that an unduly high C content in the steel will degrade the weldability of the steel. If the mass percentage of C in the steel exceeds 0.30%, more twin crystals are likely to appear after quenching, which increases the crack sensitivity. In view of the above, in the ultra-high-strength steel having excellent plasticity according to the present disclosure, the mass percentage of C is controlled at 0.26-0.30 wt %.

In some preferred embodiments, the mass percentage of C may be controlled at 0.26-0.28 wt %.

Si: In the ultra-high-strength steel having excellent plasticity according to the present disclosure, the Si element can strongly curb formation of cementite during the partitioning treatment process, thereby facilitating enrichment of carbon into retained austenite, and improving the stability of retained austenite. The content of the Si element required to effectively suppress cementite is at least 0.8%. It should be noted that if the content of the Si element in the steel is too high, the high-temperature plasticity of the steel will be reduced, and the incidence of hot rolling defects will increase. At the same time, when the Si content is too high, stable oxides will be formed on the surface of the steel plate. This will adversely affect the subsequent pickling process. In view of the above, in the ultra-high-strength steel having excellent plasticity according to the present disclosure, the mass percentage of Si is controlled at 0.8-1.00 wt %.

In some preferred embodiments, the mass percentage of Si may be controlled at 0.9-1.00 wt %.

Mn: In the ultra-high-strength steel having excellent plasticity according to the present disclosure, the Mn element can enlarge the austenite phase region, reduce the Ms and Mf points, effectively improve the austenite stability and the hardenability of the steel, and reduce the critical transformation rate. This is conducive to preservation of retained austenite to room temperature. At the same time, Mn is also a relatively important solid solution strengthening element. However, it should be noted that an unduly high content of Mn in the steel may deteriorate the corrosion resistance and the welding performance, aggravate the trend of grain coarsening, and reduce the plasticity and toughness of the steel. In view of the above, in the ultra-high-strength steel having excellent plasticity according to the present disclosure, the mass percentage of Mn is controlled at 2.80-3.30 wt %.

In some preferred embodiments, the mass percentage of Mn may be controlled at 2.9-3.1 wt %.

Al: In the ultra-high-strength steel having excellent plasticity according to the present disclosure, when the Al element exists in a solid solution state, it can not only increase the stacking fault energy, but also inhibit precipitation of cementite and transformation from γ to martensite, thereby improving the stability of austenite. In addition, the Al element can also form dispersively distributed insoluble fine particles with C and N, and can refine grains. Nevertheless, the strengthening effect of Al is weaker than that of Si, and its ability to stabilize austenite is also weaker than that of Si. If the mass percentage of the Al element in the steel is too high, a large quantity of oxide inclusions tend to form. This is not conducive to the cleanliness of molten steel. In view of the above, in the ultra-high-strength steel having excellent plasticity according to the present disclosure, the mass percentage of Al is controlled at 0.04-0.08 wt %.

Further, in the ultra-high-strength steel having excellent plasticity according to the present disclosure, the mass percentages of the various chemical elements satisfy at least one of the following:

C: 0.26-0.28 wt %;
Si: 0.9-1.00 wt %;
Mn: 2.9-3.1 wt %.

Further, the ultra-high-strength steel having excellent plasticity according to the present disclosure further comprises at least one of the following chemical elements:

$0 < Cr \leq 0.05$ wt %;
$0 < Mo \leq 0.05$ wt %;
$0 < Nb \leq 0.03$ wt %;
$0 < Ti \leq 0.05$ wt %;
$0 < V \leq 0.03$ wt %;
$0 < B \leq 30.001$ wt %.

The above elements of Cr, Mo, Nb, Ti, V and B can all further improve the performances of the high-strength steel of the present disclosure. For example, the Cr and Mo elements can improve the hardenability of the steel, and adjust the strength of steel. Nonetheless, Cr may be enriched on the surface of the steel plate and affect the welding performance, while a high mass percentage of Mo may increase the deformation resistance of the steel in cold rolling. For another example, the Nb, Ti and V elements can form fine carbides with C to promote refinement of the structure, but the formation of such fine carbides is not conducive to the enrichment of C into retained austenite and the stabilization of retained austenite. The main function of the B element is to improve the hardenability of the steel. B is prone to segregation at the austenite grain boundary, and delays transformation of austenite to ferrite. A lower content of B has an obvious effect. If the mass percentage of B is too high, the steel strength will be increased, which is not conducive to obtaining good plasticity. Therefore, the mass percentage of B may be controlled at $0 < B \leq 0.001\%$.

On the other hand, the addition of the above elements will increase the material cost. To balance the performances and the cost control, in the technical solution of the present disclosure, at least one of the above elements may be added preferably.

Still further, in the ultra-high-strength steel having excellent plasticity according to the present disclosure, the various chemical elements satisfy at least one of the following:

0<Cr≤0.03 wt %;
0<Mo≤0.03 wt %;
0<Nb≤0.01 wt %;
0<Ti≤0.03 wt %;
0<V≤0.1 wt %.

Further, in the ultra-high-strength steel having excellent plasticity according to the present disclosure, the other unavoidable impurities include: P≤0.01 wt %, S≤0.01 wt %, N≤0.006 wt %.

In the above technical solution, the P, S and N elements are all impurity elements. Among them, although P can play a role in solid solution strengthening, inhibit formation of carbides, and help to improve the stability of retained austenite, an unduly high mass percentage of P will weaken the grain boundary, increase the brittleness of the material, and deteriorate the welding performance. That is to say, the positive effect of the P element is weaker than its negative effect. Therefore, the mass percentage of P is preferably controlled at P≤0.01 wt %. In respect of N, an unduly high mass percentage of N will make steelmaking and continuous casting difficult, which is not conducive to the control of inclusions. Therefore, it is preferable to control the mass percentage of N at N≤0.006 wt %. In addition, if the mass percentage of the S element in the steel is too high, the plasticity of the material will be deteriorated significantly. Hence, the mass percentage of S is controlled at S≤0.01 wt %.

Further, the mass percentages of the chemical elements in the ultra-high-strength steel having excellent plasticity according to the present disclosure are:

C: 0.26-0.30 wt %, preferably 0.26-0.28 wt %;
Si: 0.8-1.00 wt %, preferably 0.9-1.00 wt %;
Mn: 2.80-3.30 wt %, preferably 2.9-3.1 wt %;
Al: 0.04-0.08 wt %;
Cr: ≤0.05 wt %, preferably 0.03 wt %;
Mo: ≤0.05 wt %, preferably 0.03 wt %;
Nb: ≤0.03 wt %, preferably 0.01 wt %;
Ti: ≤0.05 wt %, preferably 0.03 wt %;
V: ≤0.03 wt %, preferably 0.01 wt %;
B: ≤0.001 wt %;
P: ≤0.01 wt %;
S: ≤0.01 wt %;
N≤0.006 wt %;
a balance of Fe and other unavoidable impurities.

Further, in the ultra-high-strength steel having excellent plasticity according to the present disclosure, the microstructure comprises 20 vol. %-40 vol. % ferrite+50 vol. %-70 vol. % martensite+retained austenite.

Further, in the ultra-high-strength steel having excellent plasticity according to the present disclosure, ferrite comprises 90% or more of grains of 10 μm or less, and 60% or more of grains of 5 μm or less.

Further, in the ultra-high-strength steel having excellent plasticity according to the present disclosure, the average grain size of retained austenite is ≤2 μm; and/or the average C content in retained austenite is ≥1.1 wt %. In some embodiments, in the ultra-high-strength steel having excellent plasticity according to the present disclosure, the average grain size of retained austenite is 0.6-1.6 μm. In some embodiments, in the ultra-high-strength steel having excellent plasticity according to the present disclosure, the average C content in retained austenite is 1.1-1.35 wt %.

Further, in the ultra-high-strength steel having excellent plasticity according to the present disclosure, the yield strength is 850-1000 MPa; the tensile strength is 1180-1300 MPa; the uniform elongation is ≥11%; and the elongation at break is 15%-20%.

Accordingly, another object of the present disclosure is to provide a method for manufacturing the above ultra-high-strength steel having excellent plasticity. This manufacturing method utilizes a thin slab continuous casting process in combination with a pickling or pickling-rolling process. After continuous annealing, an ultra-high-strength steel having excellent plasticity is obtained. This manufacturing method is simple in production. The high-strength steel thus obtained has a further improved elongation while the strength is maintained.

To fulfil the above object, the present disclosure provides a method for manufacturing the above ultra-high-strength steel having excellent plasticity, comprising steps:

(1) smelting and thin slab continuous casting: controlling a slab thickness at an exit end in the continuous casting at 55-60 mm;
(2) heating;
(3) hot rolling: thickness of an oxide scale on a surface of a hot-rolled steel strip: ≤6 μm; (FeO+Fe$_3$O$_4$) in the oxide scale on the surface of the hot-rolled steel strip: ≤40 wt %;
(4) pickling or pickling+cold rolling;
(5) continuous annealing: annealing at 800-920° C.; slowly cooling to 690-760° C. at a cooling rate of 3-10° C./s to obtain a certain proportion of ferrite; rapidly cooling to 250-350° C. at a cooling rate of 50-100° C./s to transform austenite partially to martensite; reheating to 360-460° C., holding for 100-400 s, and finally cooling to room temperature.

In the technical solution of the present disclosure, due to the utilization of thin slab continuous casting in step (1), a rough rolling process can be omitted. As a result, the amount of hot rolling deformation can be reduced, thereby guaranteeing the performances of the steel plate in subsequent steps (4) and (5). In addition, due to the utilization of thin slab continuous casting in step (1), the heat of the slab can be used fully to reduce the energy consumption required for the heating, so as to obtain a more uniform structure of ferrite or ferrite+pearlite. This is advantageous because a certain amount of fine-grained ferrite can be maintained in the microstructure of the finished product obtained in subsequent step (5), and the uniformity of the structure is increased, which is conducive to improving the plasticity.

In step (3), the control of the thickness of the oxide scale on the surface of the hot-rolled steel strip at ≤6 μm and (FeO+Fe$_3$O$_4$) in the oxide scale on the surface of the hot-rolled steel strip at ≤40 wt % is beneficial to the proceeding of subsequent step (4), and has a great influence on the performances of the steel plate obtained after the continuous annealing. This is because FeO and Fe$_3$O$_4$ are more difficult to pickle than Fe$_2$O$_3$ in the technical solution of the present disclosure.

The control of the thickness of the oxide scale on the surface of the hot-rolled steel strip and (FeO+Fe$_3$O$_4$)≤40 wt % in the oxide scale on the surface of the hot-rolled steel strip in the present disclosure can improve the pickling effect, and provide a pickled plate surface that can be subjected to the continuous annealing directly. Because the pickled plate can be subjected to the continuous annealing directly, the amount of deformation of the structure in hot rolling is small, and the structure of the steel plate is dominated by ferrite and pearlite or bainite. Therefore, under the same continuous annealing conditions, the strength of the material can be reduced, and the structure is more uniform, so that excellent ductility can be obtained.

In step (5), a homogenized austenite structure or austenite+ferrite structure can be formed by controlling the annealing temperature at 800-920° C. Slowly cooling to 690-760° C. at a cooling rate of 3-10° C./s can further adjust the ferrite content in the structure, and improve the plasticity of the material. Then, cooling to 250-350° C. is performed at a cooling rate of 50-100° C./s (i.e., between Ms and Mf temperature), because the critical cooling rate should be no less than 50° C./s in order to ensure that only martensitic transformation occurs during the cooling process, and the production cost will increase enormously if the cooling rate exceeds 100° C./s. At this time, austenite is partially transformed to martensite to guarantee high strength of the steel. Reheating to 360-460° C. and holding for 100-400 s causes partitioning of carbon in martensite and austenite, forming a certain amount of retained austenite rich in carbon. This retained austenite rich in carbon is stably maintained to room temperature. Due to the TRIP effect, the work hardening ability and formability of the steel can be improved significantly, and the ultra-high-strength steel plate having excellent plasticity is obtained. The partitioning process is set as described above for the following reason: if the reheating temperature is lower than 360° C. or the reheating time is less than 100 s, stabilization of retained austenite in the steel is not adequate, and the amount of retained austenite obtained finally at room temperature will be insufficient; if the reheating temperature is higher than 460° C. or the reheating time is longer than 400 s, the steel will undergo obvious temper softening, which will lead to a significant decrease in the strength of the material obtained finally.

Since a high-carbon and high-manganese composition is designed for the ultra-high-strength steel in the present disclosure and a ferrite grain refinement mechanism is involved, during the continuous annealing process, the nucleation sites for austenite reverse transformation increase, and the size further decreases. The average grain size of the retained austenite that is maintained stably to room temperature can be ≤2 μm; and the average C content in the retained austenite is ≥1.1%. In addition, due to the high Si design, martensite formed by rapid cooling is substantially not decomposed during the partitioning process, so as to guarantee the content of martensite in the structure and the strength of the steel.

Further, in the manufacturing method according to the present disclosure, in step (1), a drawing speed in the continuous casting is controlled at 2-5 m/min.

Further, in the manufacturing method according to the present disclosure, in step (2), the slab is heated to 1200-1300° C.

Further, in the manufacturing method according to the present disclosure, in step (3), the finishing rolling temperature is controlled at 860-930° C., and the coiling temperature is 450-600° C.

Further, in the manufacturing method according to the present disclosure, in step (4), when a step of pickling+cold rolling is employed, an amount of deformation is controlled at 40%-70%.

Further, in the manufacturing method according to the present disclosure, in step (5), the continuous annealing process is controlled to satisfy at least one of the following:
annealing temperature of 820-870° C.;
slowly cooling to 700-730° C. at a cooling rate of 3-10° C./s;
rapidly cooling to 270-330° C.;
after rapid cooling, reheating to 400-430° C. and holding for 150-300 s;
controlling a volume content of hydrogen in a reducing atmosphere in a continuous annealing furnace at 10-15%.

Compared with the prior art, the ultra-high-strength steel having excellent plasticity and the method of manufacturing the same according to the present disclosure have the following advantages and beneficial effects:

The high-strength steel according to the present disclosure is based on a carbon-silicon-manganese steel with no addition of any expensive alloy element. By optimizing the fractions of carbon, silicon and manganese, a high-strength cold-rolled steel plate having excellent ductility is obtained.

A unique production process is employed for the manufacturing method of the present disclosure. The method has inherent advantages in terms of structure uniformity and segregation control due to the use of the thin slab continuous casting technology. The ultra-high-strength steel thus obtained has a significantly increased elongation when the strength is the same. It is promising for use in automobile safety structural parts, especially suitable for manufacture of vehicle structural parts and safety parts having complex shapes and high formability requirements, such as A/B pillars, door crash bars, side members, bumpers, etc.

BRIEF DESCRIPTIONS OF THE DRAWINGS

DETAILED DESCRIPTIONS

Figure 1:
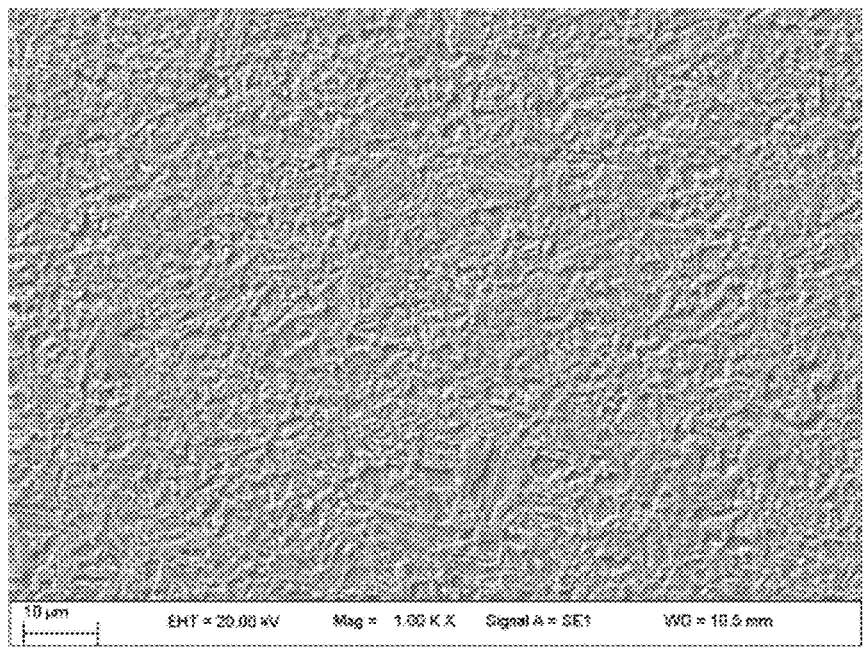
FIG. 1 is an image showing the microstructure of the ultra-high-strength steel of Example 4.

The ultra-high-strength steel having excellent plasticity according to the present disclosure and the method for manufacturing the same will be further explained and illustrated with reference to the accompanying drawings of the specification and the specific Examples. Nonetheless, the explanation and illustration are not intended to unduly limit the technical solution of the present disclosure.

Examples 1-24 and Comparative Examples 1-3

The ultra-high-strength steel having excellent plasticity in each of Examples 1-24 was prepared by the following steps:
(1) performing smelting and thin slab continuous casting on the chemical compositions shown in Table 1: the slab thickness at the exit end in the continuous casting was controlled at 55-60 mm, and the speed of drawing the continuously cast slab was controlled at 2-5 m/min.
(2) heating: the slab was heated to 1200-1300° C.
(3) hot rolling: the thickness of the oxide scale on the surface of the hot-rolled steel strip was ≤6 μm; (FeO+$Fe_3O_4$) in the oxide scale on the surface of the hot-rolled steel strip was ≤40 wt %; the finishing rolling temperature was controlled at 860-930° C.; and the coiling temperature was 450-600° C.
(4) pickling or pickling+cold rolling: when the step of pickling+cold rolling was used, the amount of deformation was controlled at 40%-70%.
(5) continuous annealing: the steel strip was annealed at 800-920° C.; slowly cooled to 690-760° C. at a cooling rate of 3-10° C./s to obtain a certain proportion of ferrite; rapidly cooled to 250-350° C. at a cooling rate of 50-100° C./s to transform austenite partially to martensite; reheated to 360-460° C., held for 100-400 s, and finally cooled to room temperature.

It should be noted that, in some preferred embodiments, in step (5), the parameters may be further controlled to satisfy at least one of the following:

annealing temperature of 820-870° C.;

slowly cooling to 700-730° C. at a cooling rate of 3-10° C./s;

rapidly cooling to 270-330° C.;

after rapid cooling, reheating to 400-430° C. and holding for 150-300 s;

controlling a volume content of hydrogen in a reducing atmosphere in a continuous annealing furnace at 10-15%.

Comparative Examples 1-3 were obtained using the conventional process.

Table 1 lists the mass percentages of the chemical elements in the ultra-high-strength steel having excellent plasticity in each of Examples 1-24 and the comparative steel in each of Comparative Examples 1-3.

TABLE 1

(wt %, the balance is Fe and other unavoidable impurities except for P, S and N)

| No. | Steel grade | C | Si | Mn | Cr | Nb | Mo | Ni | V | Ti | B | P | S | Al | N |
|---|---|---|---|---|---|---|---|---|---|---|---|---|---|---|---|
| Exs. 1-4 | A | 0.26 | 1 | 3.3 | 0.049 | — | 0.048 | — | — | — | — | 0.010 | 0.007 | 0.040 | 0.0058 |
| Exs. 5-8 | B | 0.27 | 0.9 | 2.8 | — | — | — | — | — | 0.049 | 0.0009 | 0.010 | 0.006 | 0.052 | 0.0051 |
| Exs. 9-12 | C | 0.29 | 0.9 | 3.0 | — | — | — | — | 0.029 | 0.025 | — | 0.005 | 0.008 | 0.058 | 0.0044 |
| Exs. 13-16 | D | 0.30 | 0.8 | 2.9 | — | 0.029 | — | — | — | 0.021 | — | 0.010 | 0.008 | 0.076 | 0.0048 |
| Exs. 17-20 | E | 0.30 | 0.9 | 3.0 | — | — | — | — | — | — | — | 0.008 | 0.008 | 0.068 | 0.0056 |
| Exs. 20-24 | F | 0.28 | 0.8 | 3.1 | 0.013 | — | 0.023 | — | 0.012 | — | 0.0005 | 0.010 | 0.007 | 0.069 | 0.0048 |
| Comp. Ex. 1 | a | 0.26 | 0.7 | 2.8 | 0.03 | 0.02 | 0.006 | 0.01 | 0.002 | 0.011 | — | 0.005 | 0.005 | 0.046 | 0.0042 |
| Comp. Ex. 2 | b | 0.26 | 0.9 | 3.0 | — | — | — | — | — | — | — | 0.010 | 0.005 | — | 0.0031 |
| Comp. Ex. 3 | c | 0.28 | 0.5 | 2.9 | 0.03 | 0.02 | — | — | — | 0.021 | 0.0010 | 0.010 | 0.001 | 0.060 | 0.0044 |

Table 2-1 and Table 2-2 list the specific process parameters for the ultra-high-strength steel having excellent plasticity in each of Examples 1-24 and the comparative steel in each of Comparative Examples 1-3.

TABLE 2-1

| | | Step (1) | | Step (2) | Step (3) | | | |
|---|---|---|---|---|---|---|---|---|
| No. | Steel grade | Slab thickness (mm) | Drawing speed in continuous casting (m/min) | Slab heating temperature (° C.) | Oxide scale thickness (μm) | (FeO + Fe$_3$O$_4$) content (%) | Finishing rolling temperature (° C.) | Average coiling temperature (° C.) |
| Ex. 1 | A | 55 | 2.0 | 1220 | 3.1 | 26.7 | 903 | 476 |
| Ex. 2 | A | 55 | 2.0 | 1235 | 3.5 | 30.3 | 910 | 490 |
| Ex. 3 | A | 55 | 2.0 | 1260 | 4.5 | 33.5 | 908 | 500 |
| Ex. 4 | A | 55 | 2.0 | 1280 | 5.8 | 28.6 | 925 | 470 |
| Ex. 5 | B | 58 | 3.0 | 1230 | 4.8 | 32.7 | 930 | 530 |
| Ex. 6 | B | 58 | 3.0 | 1290 | 5.7 | 28.6 | 922 | 497 |
| Ex. 7 | B | 58 | 3.0 | 1210 | 3.8 | 31.7 | 917 | 450 |
| Ex. 8 | B | 58 | 3.0 | 1260 | 4.3 | 33.3 | 920 | 562 |
| Ex. 9 | C | 58 | 4.0 | 1230 | 3.2 | 28.6 | 860 | 455 |
| Ex. 10 | C | 58 | 4.0 | 1245 | 3.3 | 25.2 | 920 | 500 |
| Ex. 11 | C | 58 | 4.0 | 1210 | 3.5 | 29.3 | 924 | 525 |
| Ex. 12 | C | 58 | 4.0 | 1290 | 5.8 | 32.9 | 919 | 560 |
| Ex. 13 | D | 60 | 5.0 | 1245 | 4.2 | 34.4 | 875 | 580 |
| Ex. 14 | D | 60 | 5.0 | 1230 | 3.6 | 35.8 | 886 | 525 |
| Ex. 15 | D | 60 | 5.0 | 1210 | 3.1 | 28.9 | 885 | 495 |
| Ex. 16 | D | 60 | 5.0 | 1290 | 5.9 | 38.1 | 913 | 600 |
| Ex. 17 | E | 56 | 2.5 | 1240 | 4.6 | 33.7 | 930 | 530 |
| Ex. 18 | E | 56 | 2.5 | 1290 | 5.8 | 38.6 | 922 | 497 |
| Ex. 19 | E | 56 | 2.5 | 1220 | 3.8 | 28.7 | 880 | 470 |
| Ex. 20 | E | 56 | 2.5 | 1260 | 4.1 | 33.3 | 920 | 562 |
| Ex. 21 | F | 59 | 4.5 | 1250 | 4.3 | 34.4 | 875 | 580 |

TABLE 2-1-continued

| | | Step (1) | | | | Step (3) | | |
|---|---|---|---|---|---|---|---|---|
| No. | Steel grade | Slab thickness (mm) | Drawing speed in continuous casting (m/min) | Step (2) Slab heating temperature (° C.) | Oxide scale thickness (μm) | (FeO + Fe$_3$O$_4$) content (%) | Finishing rolling temperature (° C.) | Average coiling temperature (° C.) |
| Ex. 22 | F | 59 | 4.5 | 1230 | 3.6 | 32.8 | 870 | 525 |
| Ex. 23 | F | 59 | 4.5 | 1210 | 3.3 | 28.9 | 885 | 475 |
| Ex. 24 | F | 59 | 4.5 | 1290 | 5.9 | 38.1 | 913 | 590 |
| Comp. Ex. 1 | a | 200 | 1.0 | 1350 | 8.0 | 60.0 | 950 | 620 |
| Comp. Ex. 2 | b | 200 | 2.5 | 1250 | 4.3 | 50.0 | 870 | 580 |
| Comp. Ex. 3 | c | 60 | 3.0 | 1230 | 4.5 | 34.5 | 900 | 500 |

TABLE 2-2

| | Step (4) | | Step (5) | | | | | |
|---|---|---|---|---|---|---|---|---|
| No. | Cold rolling deformation amount (%) | Annealing temperature (° C.) | Slow cooling rate (° C./s) | Initial temperature of rapid cooling (° C.) | Final temperature of rapid cooling (° C.) | Rapid cooling rate (° C./s) | Reheating temperature (° C.) | Reheating hold time (s) |
| Ex. 1 | 40 | 850 | 9 | 700 | 290 | 90 | 410 | 200 |
| Ex. 2 | 40 | 845 | 7 | 715 | 280 | 70 | 420 | 160 |
| Ex. 3 | 40 | 830 | 4 | 690 | 250 | 91 | 360 | 320 |
| Ex. 4 | 40 | 835 | 8 | 700 | 285 | 57 | 405 | 220 |
| Ex. 5 | 50 | 870 | 4 | 710 | 290 | 80 | 410 | 150 |
| Ex. 6 | 50 | 840 | 9 | 730 | 270 | 90 | 460 | 110 |
| Ex. 7 | 50 | 845 | 5 | 710 | 310 | 95 | 415 | 280 |
| Ex. 8 | 50 | 825 | 4 | 690 | 260 | 90 | 420 | 220 |
| Ex. 9 | 60 | 920 | 8 | 750 | 350 | 85 | 430 | 200 |
| Ex. 10 | 60 | 900 | 9 | 730 | 260 | 62 | 420 | 240 |
| Ex. 11 | 60 | 860 | 6 | 700 | 270 | 66 | 410 | 280 |
| Ex. 12 | 60 | 840 | 8 | 725 | 280 | 86 | 430 | 150 |
| Ex. 13 | 70 | 810 | 6 | 730 | 270 | 55 | 390 | 250 |
| Ex. 14 | 70 | 820 | 5 | 710 | 290 | 76 | 410 | 220 |
| Ex. 15 | 70 | 840 | 10 | 700 | 270 | 100 | 430 | 140 |
| Ex. 16 | 70 | 880 | 10 | 720 | 260 | 70 | 420 | 200 |
| Ex. 17 | 55 | 870 | 4 | 700 | 290 | 80 | 410 | 150 |
| Ex. 18 | 55 | 840 | 9 | 730 | 270 | 90 | 450 | 110 |
| Ex. 19 | 55 | 850 | 5 | 710 | 330 | 95 | 415 | 280 |
| Ex. 20 | 55 | 860 | 4 | 690 | 260 | 90 | 420 | 240 |
| Ex. 21 | 65 | 850 | 6 | 730 | 280 | 55 | 390 | 250 |
| Ex. 22 | 65 | 830 | 5 | 710 | 300 | 80 | 400 | 220 |
| Ex. 23 | 65 | 840 | 10 | 690 | 270 | 100 | 420 | 150 |
| Ex. 24 | 65 | 880 | 10 | 730 | 260 | 70 | 430 | 200 |
| Comp. Ex. 1 | 50 | 840 | 8 | 700 | 440 | 50 | 440 | 300 |
| Comp. Ex. 2 | 60 | 900 | 4 | 770 | 200 | 13 | 390 | 200 |
| Comp. Ex. 3 | 30 | 820 | 20 | 650 | 470 | 80 | 450 | 300 |

Table 3 lists the test results of the mechanical properties of the ultra-high-strength steel having excellent plasticity in each of Examples 1-24 and the comparative steel in each of Comparative Examples 1-3. ISO 6892:1998 (Room Temperature Tensile Test Method For Metallic Materials) and P14 (A$_{50}$) Tensile Specimen Standard were used for testing.

TABLE 3

| No. | YS (MPa) | TS (MPa) | UEL (%) | TEL (%) |
|---|---|---|---|---|
| Ex. 1 | 886 | 1211 | 11.22 | 16.88 |
| Ex. 2 | 892 | 1201 | 12.23 | 17.21 |
| Ex. 3 | 912 | 1189 | 11.67 | 15.38 |
| Ex. 4 | 890 | 1192 | 12.11 | 16.79 |
| Ex. 5 | 892 | 1242 | 12.12 | 17.24 |
| Ex. 6 | 865 | 1182 | 13.16 | 18.21 |
| Ex. 7 | 858 | 1203 | 12.34 | 16.12 |
| Ex. 8 | 921 | 1197 | 13.23 | 18.91 |
| Ex. 9 | 945 | 1300 | 11.13 | 15.71 |
| Ex. 10 | 991 | 1276 | 12.14 | 16.22 |
| Ex. 11 | 916 | 1221 | 12.63 | 17.22 |
| Ex. 12 | 892 | 1194 | 12.34 | 16.96 |
| Ex. 13 | 876 | 1184 | 12.76 | 18.21 |
| Ex. 14 | 863 | 1197 | 13.01 | 19.21 |
| Ex. 15 | 890 | 1212 | 12.67 | 17.89 |
| Ex. 16 | 943 | 1266 | 11.78 | 16.23 |

TABLE 3-continued

| No. | YS (MPa) | TS (MPa) | UEL (%) | TEL (%) |
|---|---|---|---|---|
| Ex. 17 | 942 | 1258 | 12.32 | 17.64 |
| Ex. 18 | 887 | 1203 | 13.36 | 18.41 |
| Ex. 19 | 901 | 1243 | 11.84 | 15.89 |
| Ex. 20 | 911 | 1198 | 13.21 | 18.76 |
| Ex. 21 | 880 | 1194 | 12.66 | 18.56 |
| Ex. 22 | 868 | 1202 | 13.23 | 19.35 |
| Ex. 23 | 896 | 1222 | 12.67 | 17.67 |
| Ex. 24 | 955 | 1286 | 11.12 | 15.34 |
| Comp. Ex. 1 | 670 | 1080 | 10.4 | 14.3 |
| Comp. Ex. 2 | 630 | 1035 | 11.2 | 13.5 |
| Comp. Ex. 3 | 660 | 1198 | 9.2 | 11.3 |

As it can be seen from Table 3, the ultra-high-strength steel having excellent plasticity in each of Examples 1-24 according to the present disclosure exhibits excellent ductility while the strength is guaranteed. The yield strength YS is 850-1000 MPa; the tensile strength TS is 1180-1300 MPa; the uniform elongation UEL is ≥11%; and the elongation at break TEL is 15%-20%.

Table 4. Microstructure observations of the ultra-high-strength steel having excellent plasticity in each of Examples 1-24.

TABLE 4

| No. | Ferrite fraction (%) | Martensite fraction (%) | Retained austenite fraction (%) | Fraction of ≤ 10 μm ferrite grains (%) | Fraction of ≤ 5 μm ferrite grains (%) | Average size of retained austenite (μm) | C content in retained austenite (%) |
|---|---|---|---|---|---|---|---|
| Ex. 1 | 28.25 | 59.56 | 12.19 | 91.77 | 72.35 | 0.6 | 1.17 |
| Ex. 2 | 29.98 | 58.55 | 11.47 | 95.64 | 64.53 | 0.7 | 1.23 |
| Ex. 3 | 28.76 | 60.12 | 11.12 | 90.97 | 74.24 | 0.8 | 1.25 |
| Ex. 4 | 31.32 | 56.34 | 12.34 | 95.98 | 69.62 | 1.1 | 1.15 |
| Ex. 5 | 24.08 | 63.15 | 12.77 | 96.06 | 64.35 | 1.0 | 1.27 |
| Ex. 6 | 27.81 | 58.78 | 13.41 | 92.19 | 77.60 | 1.3 | 1.24 |
| Ex. 7 | 29.78 | 58.33 | 11.89 | 93.24 | 62.88 | 0.9 | 1.18 |
| Ex. 8 | 25.70 | 61.45 | 12.85 | 94.26 | 64.45 | 1.4 | 1.21 |
| Ex. 9 | 20.54 | 69.34 | 10.12 | 97.24 | 73.50 | 0.7 | 1.31 |
| Ex. 10 | 21.55 | 66.67 | 11.78 | 98.66 | 72.49 | 1.2 | 1.24 |
| Ex. 11 | 26.70 | 61.34 | 11.96 | 93.84 | 73.96 | 0.9 | 1.13 |
| Ex. 12 | 29.11 | 58.12 | 12.77 | 91.29 | 76.51 | 0.6 | 1.17 |
| Ex. 13 | 38.89 | 50.23 | 10.88 | 97.12 | 79.01 | 1.6 | 1.26 |
| Ex. 14 | 30.34 | 57.96 | 11.70 | 93.22 | 75.06 | 1.1 | 1.24 |
| Ex. 15 | 29.67 | 58.45 | 11.88 | 93.67 | 74.51 | 1.4 | 1.15 |
| Ex. 16 | 21.07 | 67.56 | 11.37 | 95.74 | 70.73 | 1.2 | 1.22 |
| Ex. 17 | 25.08 | 61.15 | 13.77 | 95.06 | 64.35 | 1.0 | 1.24 |
| Ex. 18 | 30.81 | 57.78 | 11.41 | 93.19 | 75.60 | 1.2 | 1.26 |
| Ex. 19 | 29.78 | 58.33 | 11.89 | 93.54 | 65.88 | 0.9 | 1.15 |
| Ex. 20 | 26.70 | 60.45 | 12.85 | 95.44 | 64.65 | 1.6 | 1.28 |
| Ex. 21 | 39.89 | 49.23 | 10.88 | 94.12 | 69.01 | 1.5 | 1.16 |
| Ex. 22 | 28.34 | 59.96 | 11.70 | 93.54 | 73.06 | 1.2 | 1.44 |
| Ex. 23 | 31.67 | 56.45 | 11.88 | 94.67 | 74.51 | 1.4 | 1.16 |
| Ex. 24 | 22.07 | 66.56 | 11.37 | 96.74 | 72.73 | 1.5 | 1.25 |

As it can be seen from Table 3 and Table 4 in combination, the microstructure of the ultra-high-strength steel having excellent plasticity in Examples 1-24 according to the present disclosure comprises 20%-40% ferrite+50%-70% martensite+retained austenite. Ferrite comprises 90% or more grains of 10 μm or smaller, and 60% or more grains of 5 μm or smaller; the average grain size of retained austenite is ≤2 μm; and/or the average C content in retained austenite is ≥1.1 wt %. It is thus demonstrated that the ultra-high-strength steel having excellent plasticity in each of the Examples according to the present disclosure has a certain amount of fine-grained ferrite and good structure uniformity, so the high-strength steel in each of the Examples has excellent plasticity while having high strength.

FIG. 1 is an image showing the microstructure of the ultra-high-strength steel of Example 4.

Figure 2:
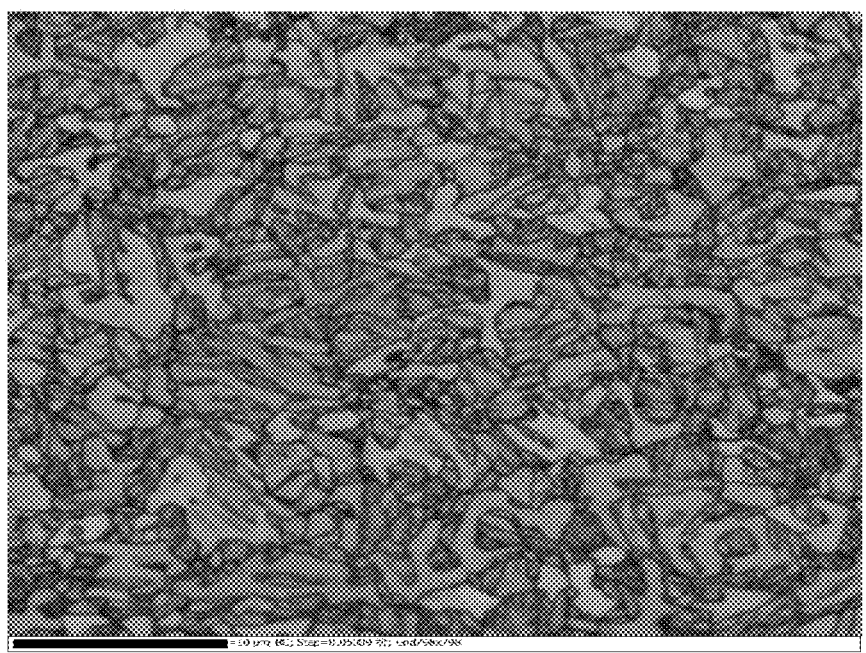
FIG. 2 is an EBSD image showing the phase composition of the ultra-high-strength steel of Example 4.

FIG. 2 is an EBSD image showing the phase composition of the ultra-high-strength steel of Example 4.

As it can be seen from FIG. 1 and FIG. 4 in combination, the microstructure of the ultra-high-strength steel in Example 4 comprises 20%-40% ferrite+50%-70% martensite+retained austenite. Ferrite comprises 90% or more grains of 10 μm or smaller, and 60% or more grains of 5 μm or smaller; the average grain size of retained austenite is ≤2 μm; and/or the average C content in retained austenite is ≥1.1 wt %.

In summary, it can be seen that the ultra-high-strength steel according to the present disclosure is based on a carbon-silicon-manganese steel with no addition of any expensive alloying element. By optimizing the fractions of carbon, silicon and manganese, and using the thin slab continuous casting technology, it has inherent advantages in terms of structure uniformity and segregation control.

The manufacturing method according to the present disclosure is simple in production process. The ultra-high-strength steel thus obtained has a significantly increased elongation when the strength is the same. It is promising for use in automobile safety structural parts, especially suitable for manufacture of vehicle structural parts and safety parts having complex shapes and high formability requirements, such as A/B pillars, door crash bars, side members, bumpers, etc.

It's to be noted that the prior art portions in the protection scope of the present disclosure are not limited to the examples set forth in the present application file. All the prior art contents not contradictory to the technical solution of the present disclosure, including but not limited to prior patent literature, prior publications, prior public uses and the like, may all be incorporated into the protection scope of the present disclosure.

In addition, the ways in which the various technical features of the present disclosure are combined are not limited to the ways recited in the claims of the present disclosure or the ways described in the specific examples. All the technical features recited in the present disclosure may be combined or integrated freely in any manner, unless contradictions are resulted.

It should also be noted that the Examples listed above are only specific examples according to the present disclosure. Obviously, the present disclosure is not limited to the above Examples. Similar changes or modifications made accordingly can be directly derived from the present disclosure or are readily conceivable to those skilled in the art, and they all fall in the protection scope of the present disclosure.

What is claimed is:

1. An ultra-high-strength steel having excellent plasticity, comprising chemical elements in mass percentages of:
   C: 0.26-0.30 wt %;
   Si: 0.8-1.00 wt %;
   Mn: 2.80-3.30 wt %;
   Al: 0.04-0.08 wt %;
   a balance of Fe and unavoidable impurities;
   wherein the ultra-high strength steel having excellent plasticity has a microstructure comprising 20 vol. %-40 vol. % ferrite, 50 vol. %-70 vol. % martensite, and retained austenite, and
   wherein the ultra-high strength steel having excellent plasticity has a yield strength of 850-1000 MPa, a tensile strength of 1180-1300 MPa, a uniform elongation of ≥11%; and an elongation at break of 15%-20%.

2. The ultra-high strength steel having excellent plasticity according to claim 1, wherein the mass percentages of the chemical elements satisfy at least one of:
   C: 0.26-0.28 wt %;
   Si: 0.9-1.00 wt %;
   Mn: 2.9-3.1 wt %.

3. The ultra-high strength steel having excellent plasticity according to claim 1, further comprising at least one of the following chemical elements:
   0<Cr≤0.05 wt %;
   0<Mo≤0.05 wt %;
   0<Nb≤0.03 wt %;
   0<Ti≤0.05 wt %;
   0<V≤0.03 wt %;
   0<B≤0.001 wt %.

4. The ultra-high strength steel having excellent plasticity according to claim 3, wherein the mass percentages of the chemical elements satisfy at least one of:
   0<Cr≤0.03 wt %;
   0<Mo≤0.03 wt %;
   0<Nb≤0.01 wt %;
   0<Ti≤0.03 wt %;
   0<V≤0.01 wt %.

5. The ultra-high strength steel having excellent plasticity according to claim 1, wherein among unavoidable impurities: P≤0.01 wt %, S≤0.01 wt %, N≤0.006 wt %.

6. The ultra-high strength steel having excellent plasticity according to claim 1, wherein ferrite comprises 90% or more of grains of 10 μm or less, and 60% or more of grains of 5 μm or less.

7. The ultra-high strength steel having excellent plasticity according to claim 1, wherein an average grain size of retained austenite is ≤2 μm; and/or an average C content in retained austenite is ≥1.1 wt %.

8. A manufacturing method for the ultra-high-strength steel having excellent plasticity according to claim 1, comprising steps:

(1) smelting and thin slab continuous casting: controlling a slab thickness at an exit end in the continuous casting at 55-60 mm;
(2) heating;
(3) hot rolling: thickness of an oxide scale on a surface of a hot-rolled steel strip: ≤6 μm; (FeO+Fe$_3$O$_4$) in the oxide scale on the surface of the hot-rolled steel strip: ≤40 wt %;
(4) pickling or pickling+cold rolling;
(5) continuous annealing: annealing at 800-920° C.; slowly cooling to 690-760 20 C. at a cooling rate of 3-10° C./s to obtain a certain proportion of ferrite; rapidly cooling to 250-350° C. at a cooling rate of 50-100° C./s to transform austenite partially to martensite; reheating to 360-460° C., holding for 100-400 s, and finally cooling to room temperature.

9. The manufacturing method according to claim 8, wherein in the step (1), a drawing speed in the continuous casting is controlled at 2-5 m/min.

10. The manufacturing method according to claim 8, wherein in step (2), the slab is heated to 1200-1300° C.

11. The manufacturing method according to claim 8, wherein in the step (3), a finishing rolling temperature is controlled at 860-930° C., and a coiling temperature is 450-600° C.

12. The manufacturing method according to claim 8, wherein in step (4), when a step of pickling+cold rolling is employed, an amount of deformation is controlled at 40%-70%.

13. The manufacturing method according to claim 8, wherein in step (5), the continuous annealing process is controlled to satisfy at least one of:
   annealing temperature of 820-870° C.;
   slowly cooling to 700-730° C. at a cooling rate of 3-10° C./s;
   rapidly cooling to 270-330° C.;
   after rapid cooling, reheating to 400-430° C. and holding for 150-300 s;
   controlling a volume content of hydrogen in a reducing atmosphere in a continuous annealing furnace at 10-15%.

14. The ultra-high strength steel having excellent plasticity according to claim 2, further comprising at least one of the following chemical elements:
   0<Cr≤0.05 wt %;
   0<Mo≤0.05 wt %;
   0<Nb≤0.03 wt %;
   0<Ti≤0.05 wt %;
   0<V≤0.03 wt %;
   0<B≤0.001 wt %.

15. The manufacturing method according to claim 8, wherein the ultra-high-strength steel having excellent plasticity further comprises at least one of the following chemical elements:
   0<Cr≤0.05 wt %;
   0<Mo≤0.05 wt %;
   0<Nb≤0.03 wt %;
   0<Ti≤0.05 wt %;
   0<V≤0.03 wt %;
   0<B≤0.001 wt %.

16. The manufacturing method according to claim 8, wherein ferrite comprises 90% or more of grains of 10 μm or less, and 60% or more of grains of 5 μm or less; and/or, wherein an average grain size of retained austenite is ≤2 μm; and/or an average C content in retained austenite is ≥1.1 wt %.

* * * * *